United States Patent [19]

Aghassipour

[11] Patent Number: 5,595,320
[45] Date of Patent: Jan. 21, 1997

[54] INSULATED BAG FOR BEER KEG

[76] Inventor: Xerxes K. Aghassipour, 1085 Commonwealth Ave. #187, Boston, Mass. 02215-1023

[21] Appl. No.: 348,046

[22] Filed: Dec. 1, 1994

[51] Int. Cl.[6] ............................................. B65D 30/08
[52] U.S. Cl. ...................... 220/466; 62/372; 62/530; 383/6; 383/110
[58] Field of Search ............... 62/372, 530; 220/466; 383/6, 110

[56] References Cited

U.S. PATENT DOCUMENTS

| | | |
|---|---|---|
| 2,003,050 | 5/1935 | Iselin . |
| 2,792,692 | 5/1957 | Bryan . |
| 2,917,906 | 12/1959 | Woolley . |
| 3,308,636 | 3/1967 | Schaaf . |
| 3,443,397 | 5/1969 | Donovan . |
| 3,614,875 | 10/1971 | McCallun . |
| 3,789,622 | 2/1974 | Yanes ............................... 62/396 |
| 3,991,898 | 9/1975 | Hanson et al. ..................... 220/9 |
| 4,196,034 | 4/1980 | Kimura ............................ 156/204 |
| 4,258,521 | 3/1981 | Fricker et al. .................... 52/406 |
| 4,411,643 | 10/1983 | Higginson ...................... 493/188 |
| 4,481,791 | 11/1984 | German ........................... 62/400 |
| 4,483,157 | 11/1984 | Human ............................. 62/400 |
| 4,514,993 | 5/1985 | Johnson .......................... 62/372 |
| 4,521,910 | 6/1985 | Keppel et al. ................... 383/10 |
| 4,633,678 | 6/1987 | Lea et al. ....................... 62/457 |
| 4,653,290 | 3/1987 | Byrne ............................. 62/372 |
| 4,699,282 | 10/1987 | Farrar ............................. 215/12 |
| 4,802,233 | 1/1989 | Skamser ........................... 383/15 |
| 4,802,344 | 2/1989 | Livingston et al. ............. 62/372 |
| 4,826,060 | 5/1989 | Hollingsworth ................ 224/205 |
| 4,835,985 | 6/1989 | Ilvento ........................... 62/372 |
| 4,854,736 | 8/1989 | McVeigh ......................... 383/76 |
| 4,963,175 | 10/1990 | Pace ................................ 62/372 |
| 5,190,376 | 3/1993 | Book ............................... 383/4 |
| 5,251,460 | 10/1993 | DeMarco et al. ............... 62/371 |
| 5,261,982 | 1/1993 | Yoshina ......................... 156/191 |
| 5,277,941 | 1/1994 | Marshall ......................... 428/12 |
| 5,284,294 | 2/1994 | Floyd .............................. 229/179 |

FOREIGN PATENT DOCUMENTS

| | | | |
|---|---|---|---|
| 301148 | 2/1989 | European Pat. Off. ............... | 383/110 |
| 1917385 | 10/1975 | Germany ......................... | 383/110 |
| 2641484 | 3/1978 | Germany ......................... | 383/110 |
| 2163724 | 3/1986 | United Kingdom .............. | 383/110 |
| 2227709 | 8/1990 | United Kingdom . | |

*Primary Examiner*—Stephen P. Garbe
*Attorney, Agent, or Firm*— Sofer & Haroun LLP

[57] ABSTRACT

An insulated bag having a hollow enclosing wall and one open and one covered end is disclosed. The enclosing wall and the covered end include a multilayered structure made of an inner layer of heat resistive material, an intermediate layer, filled with air or other flexible heat insulating material disposed over said inner layer, and an outer layer of a metalized polyethylene material disposed over said intermediate layer. The covered end includes a heat sealed removable disc that when removed provides an opening in said covered end.

9 Claims, 4 Drawing Sheets

INSULATED BAG FOR BEER KEG

FIELD OF THE INVENTION

This invention relates to insulated bags and a method of manufacturing thereof.

BACKGROUND OF THE INVENTION

There have been many attempts to keep beverage or food dispensers cold for a sufficient period of time. In particular, beverage kegs such as beer kegs require to remain cold for a long period of time. Such kegs are typically chilled in ice baths in washtubs, trash barrels, or the like. These chilling methods are usually messy, unsightly, and require substantial storage space.

Several cooling storage shells that have been specifically designed to keep a keg cold, also contain rigid and inflexible parts, such as rigid bottom floors or sidewalls to encase a keg in ice. As such they share the same problems as above-mentioned washtubs or trash barrels with regard to size, expense and availability.

Other cooling storage shells that are collapsible contain many different parts and therefore, tend to have high manufacturing cost. Furthermore, these collapsible cooling shells, with thin walls, are not as efficient as the rigid shells and permit heat transfer to occur at a fast rate.

Thus, there is a need for a flexible and yet inexpensive and thermally efficient cooling storage shell that permits a keg to remain cold for a long period of time.

OBJECTS AND SUMMARY OF THE INVENTION

It is an object of the present invention to provide an insulated bag that can be used to keep a keg cold either with or without ice.

It is a further object of the invention to provide an insulated bag that can be easily slipped over a keg to keep it cold for long periods of time.

It is still a further object of the invention to provide an insulated bag that can receive ice to keep a keg cold for substantially long periods of time.

It is also an object of the invention to provide an insulated bag that has low manufacturing cost.

It is also an object of the invention to provide an insulated bag that contains advertising space.

It is still a further object of the invention to provide an insulated bag that is light, flexible and easily transportable.

A still further object of the invention is to provide an insulated bag that provides an opening to attach a dispensing tap to a keg's dispensing pipe.

These and other objects of the invention are achieved by the present claimed invention, which is an insulated bag made of a cylindrical or cubic enclosing wall having one open and one covered end. The enclosing wall and the covered end are made of a multilayered material that includes an inner layer of polyethylene; an intermediate enclosed layer disposed over the inner layer, filled with air or other flexible heat insulating material; and an outer layer of a metalized polyethylene material disposed over the intermediate layer. The covered end contains a removable portion, such as a disc, that can be pulled off to provide an opening for attaching a dispensing tap to a dispensing pipe of a keg.

According to another aspect of the invention a method to manufacture an insulated bag is disclosed which includes the steps of disposing a plurality of layers on top of each other. The first layer is made of polyethylene. The second layer disposed over the first layer is an enclosure filled with air or other flexible heat insulating material. The next layer disposed over the intermediate layer is made of metalized polyethylene. The layers are then linearly sealed at two opposite sides along their width. The resulting structure is also sealed along a portion, at a location within the plane of said layers where a removable patch, such as a disc, is desired. The resulting structure is then folded so that the two opposite sealed sides meet overlap. The remaining unsealed sides are then sealed along the length of the layers to form the insulated bag.

According to another aspect of the invention, a method for using the insulated bag is disclosed, which permits the use of the bag with and without ice. For insulation without ice, the insulated bag is slipped over the keg such that the covered end of the bag covers the top surface of the keg and the open end of the bag is pulled down facing downwardly. The heat sealed circular disc portion on the covered end is then pulled off from the covered end to provide an opening for attaching a dispensing tap to the dispensing pipe of the keg.

For insulation with ice, the insulated bag is slipped over the keg such that the covered end of the bag covers the bottom of the keg and the open end of the bag is pulled up facing upwardly. The annular space between the exterior surface of the keg and the interior surface of the insulated bag is then filled with ice.

DETAILED DESCRIPTION OF THE DRAWINGS

Figure 1A:
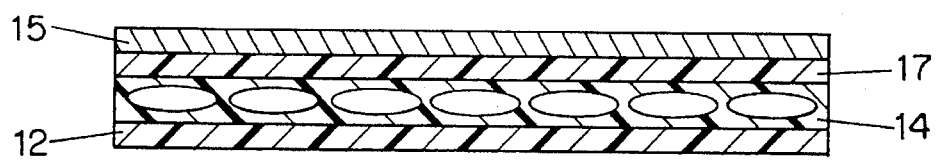
FIG. 1a illustrates the various layers that form the insulated bag of the present invention.

FIGS. 1a through 3 illustrate the method of manufacturing the insulated bag 22, made of a plurality of layers disposed over each other. In one embodiment of the invention, insulated bag 22 includes three layers as illustrated in FIG. 1a. The first layer 12 is made of a flat film of polyethylene or other plastic films with low heat conductivity. Layer 14 disposed over layer 12 is a "Bubble Wrap"® layer having a cellular structure, which contains entrapped bubbles of air or other gases. Layer 16, which is made of a flat film of metalized polyethylene, is disposed over layer 14. Layer 16 is made of a layer of aluminum 15 metalized to a polyethylene layer 17. In one embodiment of the present invention, layer 16 is manufactured by Metalized Products Inc., 37 East Street, Winchester, Mass.

Figure 2:
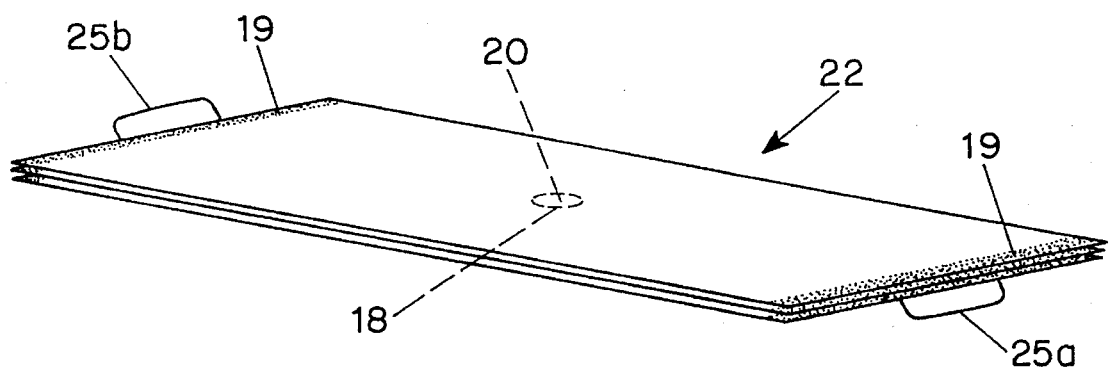
FIG. 2 illustrates the location of the first set of heat seals that seal the multiple layers of the bag across opposite edges.
Figure 3:
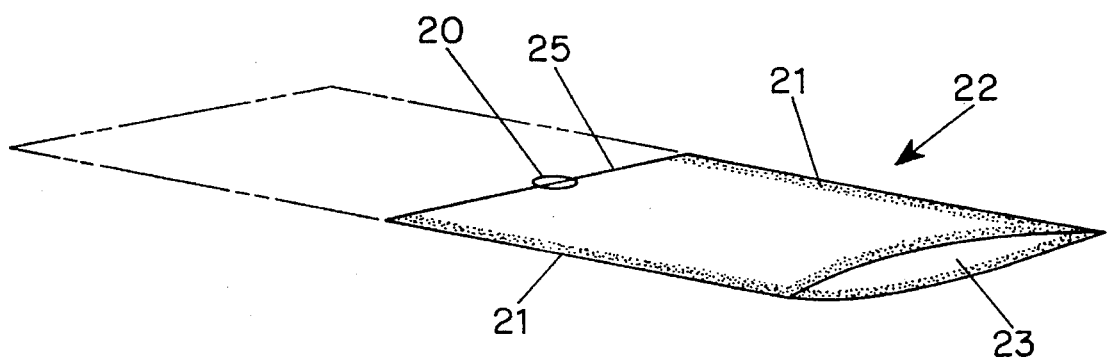
FIG. 3 illustrates the folding step of multiple layers and the location of the second seal of heat seals that seal opposite sides of the bag.

As illustrated in FIG. 2, the three layers 12, 14 and 16, are then heat sealed together at the opposite edges 19 along their width. The three layers are also circularly sealed along a circle 18 located at their center to form a removable disk 20. The resulting structure is folded over so that the sealed edges 19 overlap. The opposite sides of the structure along the lengths 21 are then sealed to form the insulated bag 22 having an open end 23 and a covered end 25.

Figure 4A:
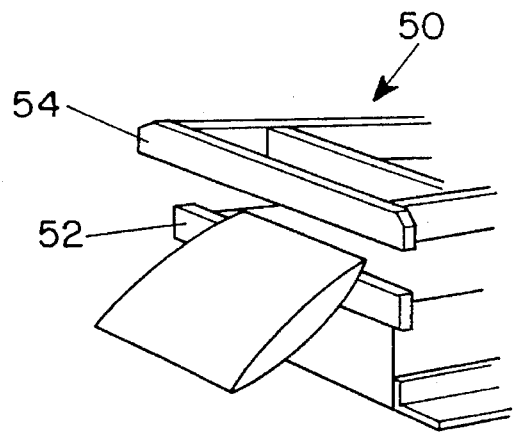
FIGS. 4(a)–4(c) illustrate the heat sealing process used for sealing the multiple layers.
Figure 4B:
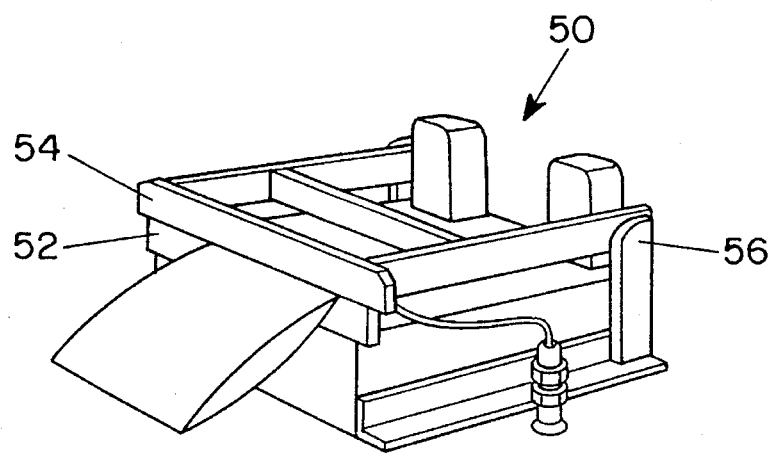
Figure 4C:
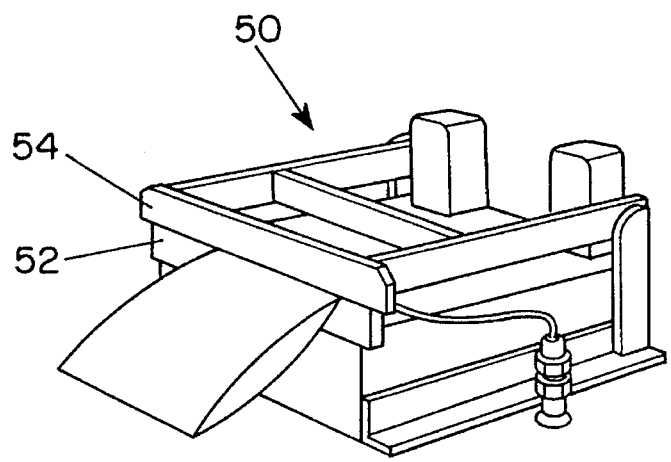

In a preferred embodiment of the present invention, layers 12, 14 and 16 are sealed by a thermal impulse sealing process using a heat sealer 50 illustrated in FIGS. 4(a) through 4(c). A typical heat sealer includes a pair of sealing jaws 52 and 54. An electrical impulse generator coupled to jaw 52, provides a short electrical impulse to heat the jaw to the melting temperature of the material to be sealed. A sturdy frame 56 provides the sealing force required by the thermoplastic material being sealed. During the operation of the heat sealer, the material is gripped by the sealing jaws 52 and 54, as illustrated in FIG. 4(a). The impulse generator heats the coupled jaw 52 to the melting point of the material being sealed, as illustrated in FIG. 4(b). Thereafter the seal is allowed to cool down, as illustrated in FIG. 4(c).

In a preferred embodiment of the present invention, the layers 12, 14 and 16 are not made of the same material. Thus, the impulse generator has to heat up the layers to the melting point of the layer with the highest melting point temperature.

Figure 1B:
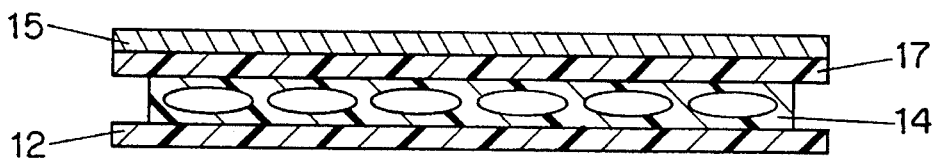
FIG. 1b illustrates an alternative embodiment of the present invention showing the Bubble Wrap layer undercut to have a smaller width and length than the inner and outer layers.

Alternatively, as illustrated in FIG. 1b, the Bubble Wrap layer 14 is undercut to have smaller width and length than that of layers 12 and 16. The Bubble Wrap layer is positioned in between the other layers such that only the edges of layers 12 and 16 overlap for sealing. The jaws 52, then seal layers 12 and 16 together, with layer 14 disposed between those layers. This arrangement of layers permits a shorter sealing time.

The sealing process explained above, causes air to be trapped between the top and bottom surface of layer 14 and the adjoining layers 16 and 12.

The combination of the layers in bag 22 provide an effective resistance to the transfer of heat from outside towards the keg. The aluminum layer 15, metalized to the plastic film 17 reflects the heat energy outside the insulated bag. Moreover, the air trapped between layers 16 and 14 and also between layers 12 and 14, and the air in the "Bubble Wrap" layer 14 prevents heat transfer through convection and conduction.

Figure 5:
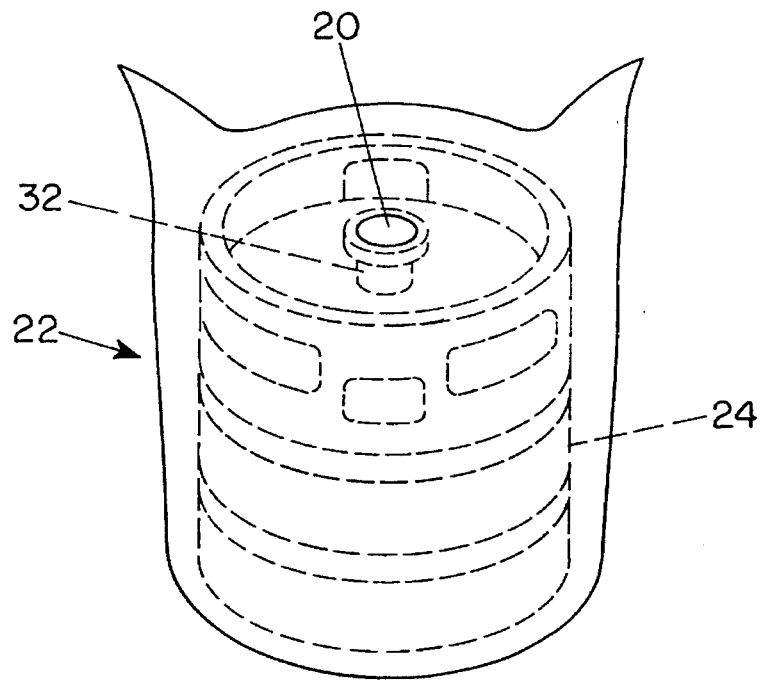
FIG. 5 illustrates the insulated bag in its first application slipped over a beverage keg to keep a keg cold without the use of ice.
Figure 6:
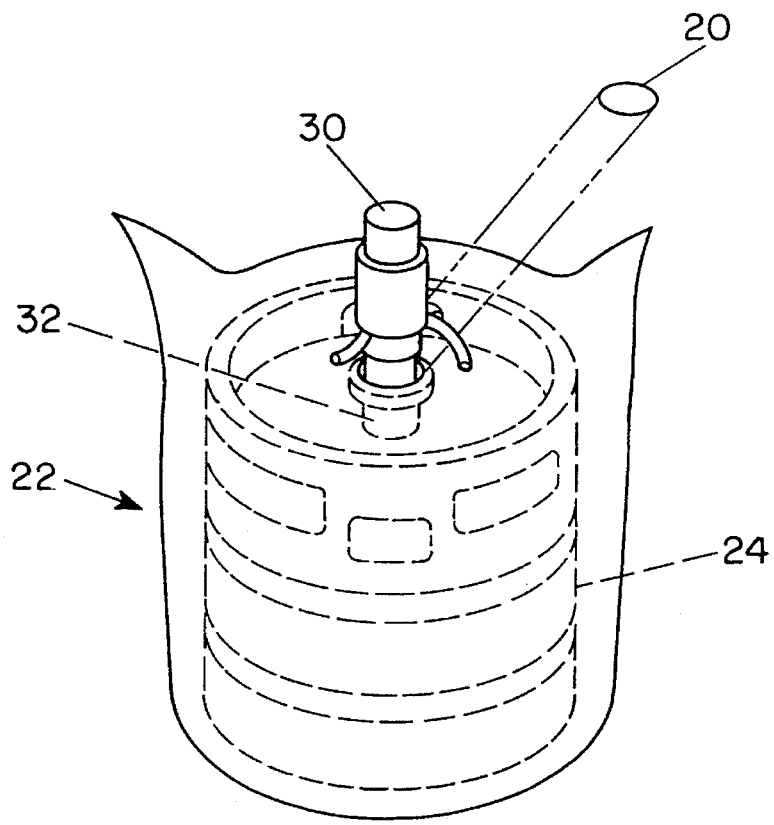
FIG. 6 illustrates the insulated bag in its first application with the circular disc removed from the covered end of the bag for providing an opening to attach a dispensing tap to the dispensing pipe of the keg.

The use of the insulated bag 22 with and without ice cooling is described in more detail with reference to FIGS. 5 through 8. In its first application without ice, as illustrated in FIGS. 5 and 6, the insulated bag 22 is slipped over the keg 24 such that the covered end of the bag covers the top surface of the keg and the open end of the bag is pulled down facing downwardly. The heat sealed circular disc 20 on the covered end is then pulled off the covered end to provide an opening through which a dispensing tap 30 is attached to the dispensing pipe 32 of keg 24.

Figure 7:
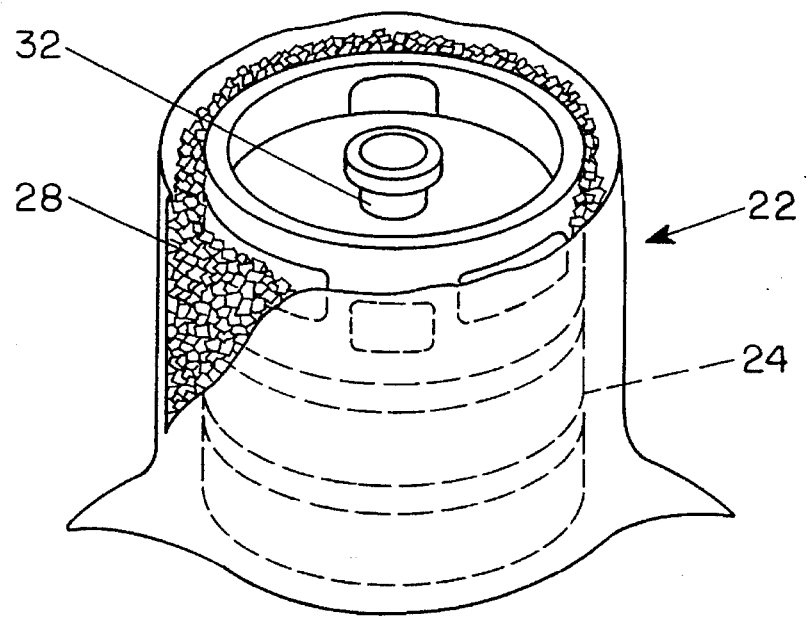
FIG. 7 illustrates the insulated bag in its second application for keeping a keg cold with the use of ice.
Figure 8:
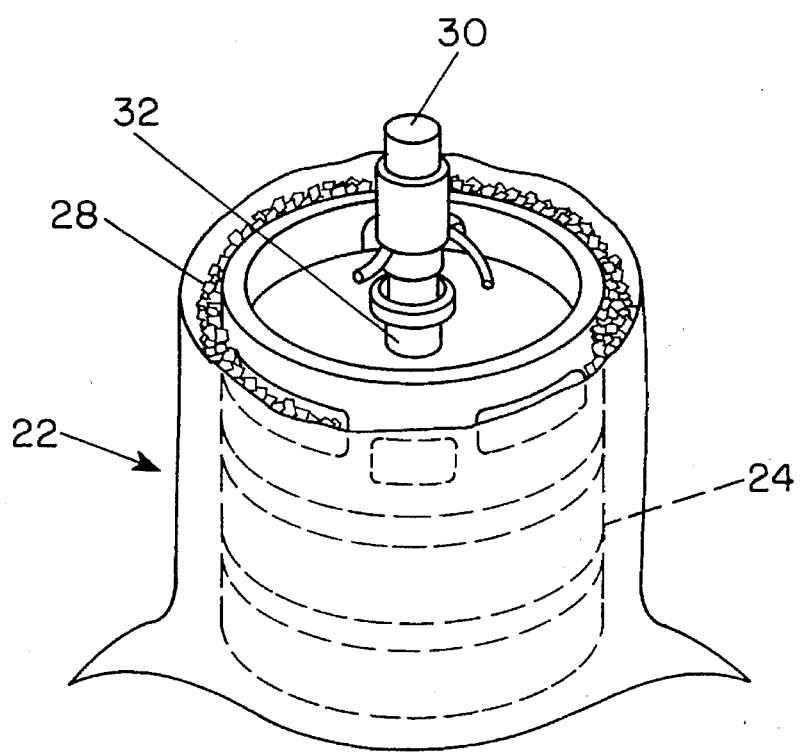
FIG. 8 illustrates the insulated bag in its second application with a dispensing tap attached to the dispensing pipe.

In its second application with ice, as illustrated in FIGS. 7 and 8, the insulated bag 22 is slipped over keg 24 such that the covered end of the bag covers the bottom of the keg and the open end of the bag is pulled up facing upwardly. The annular space between the exterior surface of the keg and the interior surface of the insulated bag is then filled with a cooling medium such as ice 28. The dispensing tap 30 is attached into the dispensing pipe 32.

The material that forms the insulated bag 22 can be used for convenient transportation of food and beverage. For example the dimensions of the insulated bag 22 are changed to that of conventional shopping bags used for carrying household food and beverages. The bag is further equipped with carrying handles 25a, 25b such as those that snap to close the open end of the bag. Other applications of the bag include use with beverage cans, bottles and other food containers.

Because of its low manufacturing cost, the bag can be disposed after each use. Conversely, because it is flexible, it can be stored easily for repeated use. Furthermore, the external aluminum surface of the bag provides a smooth surface for printing and displaying desired images and text.

Furthermore, the shape of disc 20 can be changed so that when it is pulled off, the bag provides an opening to dispense food or beverage from the insulated container.

I claim:
1. An insulated bag comprising:
   an enclosing wall having one open end and one covered end, said covered end having a removable portion, said portion when removed providing an opening in the covered end of said insulated bag;
   said enclosing wall and the covered end including, a multilayered structure having an inner layer of heat resistive material, an intermediate layer filled with air or other flexible heat insulating material disposed over said inner layer, and an outer layer of a metalized polyethylene material disposed over said intermediate layer, said inner, intermediate and outer layer sealed together around the periphery of said removable portion.

2. The insulated bag of claim 1, wherein said intermediate layer further comprises a cellular structure containing entrapped bubbles of heat insulating gases.

3. The insulated bag of claim 2 wherein said heat insulating gas is air.

4. The insulated bag of claim 2 further comprising carrying handles for transportation.

5. The insulated bag of claim 1, wherein said removable portion is in the shape of a circular disc.

6. The insulated bag of claim 5, wherein said enclosing wall is a hollow cylinder.

7. The insulated bag of claim 1, wherein said intermediate layer has smaller dimensions than said inner and outer layers, so that only the edges of said inner and outer layer overlap.

8. The insulated bag of claim 1, wherein a beverage keg is positioned inside said insulated bag for insulation, the placement of said keg in said insulated bag creates a space between the outer wall of said keg and the inner wall of said insulated bag for receiving ice therein, said keg being positioned within said insulated bag such that the covered end covers the bottom of said keg and the open end of said bag is extended upwardly towards the top of said keg.

9. The insulated bag of claim 1, wherein a beverage keg is positioned inside said insulated bag for insulation, said insulated bag encloses said keg such that said covered end of said bag covers the top portion of said keg and the open end of said insulated bag is extended downwardly towards the bottom of said keg, said removable potion of said covered end being removed to define an opening in said covered end for facilitating attachment of a dispensing tap to the dispensing pipe of said keg.

* * * * *